United States Patent [19]

Fujita et al.

[11] 4,390,391

[45] Jun. 28, 1983

[54] METHOD OF EXPOSURE OF CHEMICALLY MACHINEABLE LIGHT-SENSITIVE GLASS

[75] Inventors: Yoshimi Fujita, Akishima; Toshiharu Yamashita, Hachioji, both of Japan

[73] Assignee: Hoya Corporation, Tokyo, Japan

[21] Appl. No.: 384,114

[22] Filed: Jun. 1, 1982

[30] Foreign Application Priority Data

Jun. 26, 1981 [JP] Japan .................................. 56/98267

[51] Int. Cl.³ .................. B44C 1/22; C03C 15/00; C03C 25/06
[52] U.S. Cl. .................... 156/628; 156/643; 156/644; 156/654; 156/663; 250/492.1; 430/321
[58] Field of Search ............... 156/628, 643, 644, 654, 156/659.1, 663; 250/492.1; 430/321

[56] References Cited

U.S. PATENT DOCUMENTS 2,628,160 2/1953 Stookey .......................... 156/663 X
4,276,335 6/1981 Lemmond ....................... 156/643 X Primary Examiner—William A. Powell
Attorney, Agent, or Firm—Sughrue, Mion, Zinn, Macpeak and Seas

[57] ABSTRACT

A method for irradiating a chemically machinable light-sensitive glass plate with a parallel bundle of ultraviolet rays so as to form a tappered polygonal hole in the glass plate. A mask having a regular polygonal opening having n vertexes is mounted on a machinable light-sensitive glass plate and a light source capable of generating a parallel bundle of ultraviolet is disposed so that one of the vertexes of the polygonal opening is positioned at the longest point from the center of the light source. The glass plate is then irradiated. Thereafter, the light source is rotated about a center axis of the opening by an angle equal to 360°/n and the glass plate is re-irradiated. This procedure is conducted so that the glass plate is irradiated n times.

4 Claims, 5 Drawing Figures

METHOD OF EXPOSURE OF CHEMICALLY MACHINEABLE LIGHT-SENSITIVE GLASS

BACKGROUND OF THE INVENTION

1. Field of the Invention

The present invention is a method for irradiating a chemically machinable light-sensitive glass with a parallel bundle of ultraviolet rays to form tapered holes or slits in the light-sensitive glass.

2. Description of the Prior Art

Holes or slits are often formed in a chemically machinable light-sensitive glass by irradiating the glass with ultraviolet rays through a mask placed on the surface of the glass. Affter the irradiation, the glass is heated causing fine lithium metasilicate ($SiO_2$-$Li_2O$) crystals to grow in the irradiated area. When the thus irradiated and heated glass is treated with a hydrofluoric acid solution, the crystal area dissolves at a faster rate than the non-irradiated area of the glass forming holes or slits in the irradiated areas. The above method is used to make perforations, engravings, channels and cuttings in chemically machinable light-sensitive glass.

In accordance with the conventional method for the irradiation with ultraviolet rays which has heretofore been used to perforate chemically machinable light-sensitive glass, a parallel bundle of ultraviolet rays is applied vertically or obliquely to a chemically machinable light-sensitive glass plate with a mask mounted thereon. The mask has openings corresponding in shape and dimension to holes to be formed in the glass plate. In the conventional method, the light source and the light-sensitive glass plate are always kept in the same relative positional relationship. Thus, the diameter of the holes finally formed in the glass plate by application of hydrofluoric acid solution treatment is uniform in the direction of thickness of the glass even though the holes may be oriented vertically or obliquely relative to the glass plate. Typical holes formed by the conventional method are shown in FIG. 1(a). As can be seen, it is not possible to produce tapered holes such as those shown in FIG. 1(b) wherein the hole diameter increases in the direction of thickness of the glass according to the conventional method.

SUMMARY OF THE INVENTION

Accordingly, an object of the present invention is to provide a method for the irradiation of chemically machinable light-sensitive glass with a parallel bundle of ultraviolet rays which permits the formation of tapered holes or slits as shown in FIG. 1(b) in the light-sensitive glass when the irradiated glass is heated and then treated with a hydrofluoric acid solution.

In the present invention, a mask having a regular polygonal opening therein is mounted on a surface of a chemically machinable light-sensitive glass plate and the plate is disposed below a light source which is capable of generating a parallel bundle of ultraviolet rays in such a manner that the ultraviolet rays enter the glass at a predetermined oblique angle of incidence. One of the vertexes of the regular polygonal opening is positioned at the longest point from the central point of the light source. The lightsensitive glass plate is then irradiated and the light source is repositioned relative to the glass plate and mask so that a different vertex is at a longest point from the center of the light source and the glass plate is irradiated again. This procedure is repeated for each vertex of the regular polygonal opening.

DESCRIPTION OF THE PREFERRED EMBODIMENTS

Figures 1A, 1B:
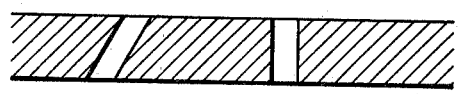
FIG. 1(a) is an enlarged cross-sectional view of a light-sensitive glass plate in which holes have been formed by the conventional method.
FIG. 1(b) is an enlarged cross-sectional view of a lightsensitive glass plate in which holes have been formed by the exposure method of the present invention.
Figure 2:
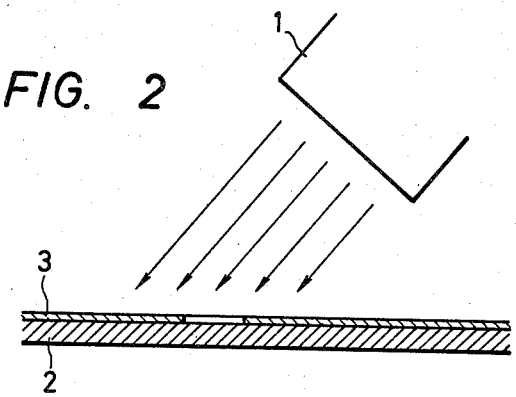
FIG. 2 is a side view illustrating the irradiation method of the invention.
Figure 3:
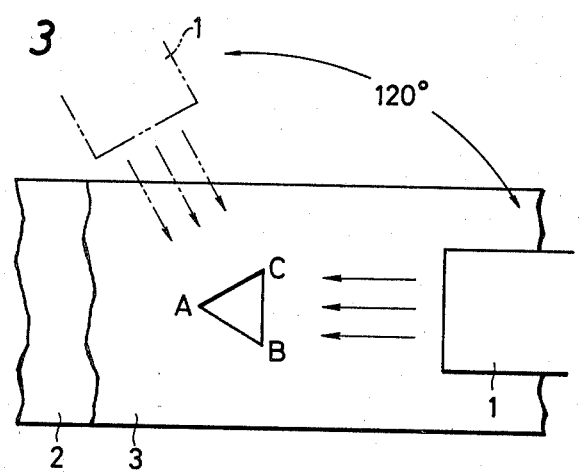
FIG. 3 is a plane view illustrating the irradiation method of the invention.

FIGS. 2 and 3 are a side view and a plane view, respectively, illustrating the relative positional relationship between a light source 1 generating a parallel bundle of ultraviolet rays, a chemically machinable light-sensitive glass plate 2, and a mask 3. As shown in FIGS. 2 and 3, the mask 3 has a regular polygonal opening and is mounted on the upper surface of the light-sensitive glass plate 2. The light source 1 is disposed so that the parallel bundle of ultraviolet rays from the light source 1 enters the light-sensitive glass plate 2 obliquely through the mask 3.

The mask 3 to be mounted on the light-sensitive glass plate 2 has a regular polygonal opening therein and n vertexes (in the case of the present embodiment, a regular triangular opening).

In accordance with the method of the invention, the light-sensitive glass plate 2 with the mask 3 mounted thereon is arranged so that a vertex A of the triangular opening is positioned at the longest point from the central point of the light source 1 as shown in FIG. 3. While holding this positional relationship, the light-sensitive glass plate 2 is exposed to the parallel bundle of ultraviolet rays from the light source 1. During this exposure, the angle of incidence of the parallel bundle of ultraviolet rays to the light-sensitive glass plate 2 is maintained constant. After the exposure is completed, the lightsensitive glass plate 2 with the mask 3 mounted thereon or the light source 1 is rotated by 360/n (°) (in the embodiment shown in FIG. 3, by 120°). By so rotating, another vertex B of the opening moves to the longest point from the central point of the light source 1.

In FIG. 3, the position of the light source 1 when the light source is rotated by 120° without changing the positions of the light-sensitive glass plate 2 and the mask 3 is indicated by the dotted line. In this state, the same exposure as above is applied. That is, the angle of incidence of the parallel bundle of ultraviolet rays to the lightsensitive glass plate 2 in this second exposure is maintained at the same level as in the first exposure.

When the second exposure is completed, the lightsensitive glass plate 1 with the mask 3 mounted thereon or the light source 1 is again rotated by 120° so that the third vertex C of the opening is positioned at the longest point from the central point of the light source 1. In this state, the third exposure is applied. In this third exposure, the angle of incidence of the parallel bundle of ultraviolet rays to the light-sensitive glass plate is maintained at the same level as in the above first and second exposures.

In the embodiment shown in FIGS. 2 and 3, the opening formed in the mask 1 is a regular triangle and, therefore, the exposure is performed three times. When the opening is a regular polygon having n vertexes, the exposure is repeated n times while rotating the light-sensitive glass plate 2 or the light source 2 by 360/n (°). During this procedure, of course, the angle of incidence of the parallel bundle of ultraviolet rays to the light-sensitive glass plate is maintained at the predetermined value.

In the embodiment shown in the figures, the light-sensitive glass plate with the mask mounted thereon or the light source is rotated for each exposure. When the light-sensitive glass plate is rotated, the mask also rotates in combination with the light-sensitive glass plate. The method of the invention can also be performed by rotating the light-sensitive glass plate alone for each exposure without changing the position of the mask and the light source.

Figure 4:
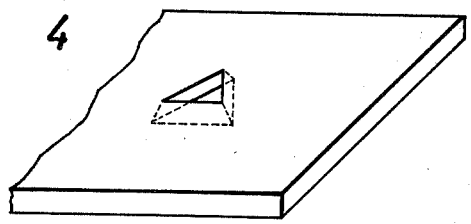
FIG. 4 is a perspective view of a light-sensitive glass plate in which a hole has been made according to the irradiation method of the invention.

The time required for the exposure according to the method of the invention varies depending on the output of the light source used, the thickness of the light-sensitive glass plate, and so forth. For example, when a regular triangular hole is formed in a 1 mm thick light-sensitive glass plate in accordance with the method of the invention by the use of a 600 W Xe-Hg lamp, the exposure is continued for 25 seconds and is repeated three times. Then when the thus exposed light-sensitive glass plate is heat-treated at 590° C. for one hour and then etched for 3 hours in a 5% hydrofluoric acid solution, a tapered hole as illustrated in FIG. 4 is formed.

It is preferred to apply the etching treatment from one side of the light-sensitive glass plate since when it is applied from both sides of the light-sensitive glass plate, the hole swells in the vicinity of the center of the side wall thereof and therefore it is not possible to form a hole tapered at a predetermined angle.

As is apparent from the above explanation, various tapered angled holes can be formed in the lightsensitive glass plate by controlling the angle of incidence of the parallel bundle of ultraviolet rays to the light-sensitive glass plate within a range not exceeding the critical angle derived from the refractive index of the mask or light-sensitive glass plate. Furthermore, there can be obtained the advantage that the crosssectional shape of the hole is exactly the same in the longitudinal direction. Thus, the method of the invention is very useful in the preparation of cell sheets for plasma display for example.

We claim:

1. A method for irradiating a chemically machinable light-sensitive glass plate with a parallel bundle of ultraviolet rays, comprising the steps of:
    mounting a mask having a regular polygonal opening therein on a surface of said plate, said polygonal opening having n vertexes;
    mounting a light source capable of generating said parallel bundle of ultraviolet rays above said mask so that said rays enter said glass at a predetermined oblique angle of incidence;
    positioning said light source so that one of said n vertexes of said polygonal opening is at a longest point from a central point of said light source;
    irradiating said plate with said parallel bundle of ultraviolet rays;
    repositioning said glass plate, said mask and said light source by rotating either said mask, said plate, or said light source about a center axis of said polygonal opening by an angle equal to 360°/n;
    re-irradiating said plate with said parallel bundle of ultraviolet rays; and
    repeating said repositioning and reirradiating steps so that said glass plate is irradiated n times.

2. The method claimed in claim 1 wherein said mask and glass plate are rotated together.

3. The method claimed in claim 1 or 2 further comprising the step of heating said glass after said irradiation is conducted n times to form lithium metasilicate crystals.

4. The method claimed in claim 3 further comprising the step of etching said glass with hydrofluoric acid solution on only one side of said glass plate.

* * * * *